United States Patent [19]

Gruettner-Merten et al.

[11] Patent Number: 5,466,790
[45] Date of Patent: Nov. 14, 1995

[54] AZO DYES WITH AN ACETALIZED DIAZO COMPONENT OF THE THIOPHENE OR THIAZOLE SERIES

[75] Inventors: Sabine Gruettner-Merten, Mutterstadt; Helmut Reichelt, Neustadt; Arno Lange, Bad Duerkheim; Helmut Degen, Frankenthal, all of Germany

[73] Assignee: BASF Aktiengesellschaft, Ludwigshafen, Germany

[21] Appl. No.: 307,794
[22] PCT Filed: Apr. 30, 1993
[86] PCT No.: PCT/EP93/01043
§ 371 Date: Sep. 30, 1994
§ 102(e) Date: Sep. 30, 1994
[87] PCT Pub. No.: WO93/23479
PCT Pub. Date: Nov. 25, 1993

[30] Foreign Application Priority Data

May 12, 1992 [DE] Germany ............. 42 15 495.2

[51] Int. Cl.$^6$ ................. C09B 29/033; C09B 29/042; C09B 67/48; D06P 1/18
[52] U.S. Cl. ............... 534/753; 534/575; 534/630; 534/765; 534/766; 534/768; 534/769; 534/774; 534/791; 534/795; 534/599
[58] Field of Search .................. 534/630, 753, 534/765, 766, 768, 769, 774, 791, 795

[56] References Cited

U.S. PATENT DOCUMENTS

| | | | |
|---|---|---|---|
| 4,395,544 | 7/1983 | Egli | 546/209 |
| 5,079,365 | 1/1992 | Sens et al. | 546/119 |
| 5,132,411 | 7/1992 | Egli et al. | 534/753 |

FOREIGN PATENT DOCUMENTS

| | | |
|---|---|---|
| 0362637 | 9/1989 | European Pat. Off. |
| 0390666 | 3/1990 | European Pat. Off. |
| 1583377 | 4/1977 | United Kingdom |

*Primary Examiner*—Johann Richter
*Assistant Examiner*—Fiona Powers
*Attorney, Agent, or Firm*—Oblon, Spivak, McClelland, Maier, & Neustadt

[57] ABSTRACT

Azo dyes of the formula

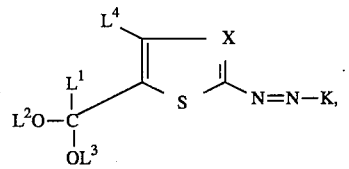

where

L$^1$ is hydrogen, C$_1$–C$_8$-alkyl or phenyl,
L$^2$ and L$^3$ are each substituted or unsubstituted C$_1$–C$_8$-alkyl, or together a radical of the formula

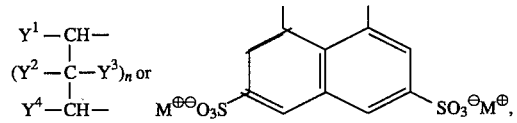

where n is 0, 1 or 2, Y$^1$ and Y$^4$ are hydrogen, hydroxymethyl, 1,2-dihydroxyethyl or a radical of the formula COO⊕M⊖ or SO$_3$⊖M⊕, Y$^2$ and Y$^3$ are halogen or hydroxymethyl, and M⊕ is the equivalent of a cation, L$^4$ is hydrogen, substituted or unsubstituted C$_1$–C$_8$-alkyl, substituted or unsubstituted phenyl, halogen, C$_1$–C$_8$-alkoxy, substituted or unsubstituted phenoxy, C$_1$–C$_8$-alkylthio, C$_1$–C$_8$-alkylsulfonyl, substituted or unsubstituted phenylthio, substituted or unsubstituted phenylsulfonyl, C$_1$–C$_8$-alkoxycarbonyl, C$_3$–C$_6$-alkenyloxycarbonyl or phenoxycarbonyl, X is nitrogen or the radical C—L$^5$, where L$^5$ is as defined in the specification, K is the radical of a coupling component, and novel crystal forms of thienylazobenzene dyes are useful for dyeing or printing textile materials.

6 Claims, No Drawings

AZO DYES WITH AN ACETALIZED DIAZO COMPONENT OF THE THIOPHENE OR THIAZOLE SERIES

This is a 371 of application no. PCT /EP93/01043, filed Apr. 30, 1993 now patent no. WO93/23479.

The present invention relates to novel azo dyes of formula I

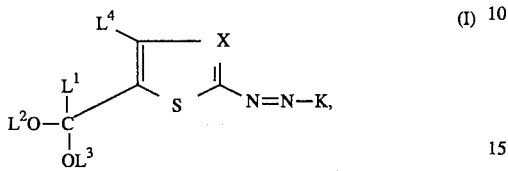

where

L$^1$ is hydrogen, C$_1$–C$_8$-alkyl or phenyl,

L$^2$ and L$^3$ are identical or different and each is independently of the other C$_1$–C$_8$-alkyl, which may be substituted and may be interrupted by 1 or 2 oxygen atoms in ether function, or together are a radical of the formula

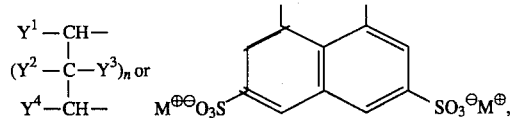

where n is 0, 1 or 2, Y$^1$ and Y$^4$ are identical or different and each is independently of the other hydrogen, hydroxymethyl, 1,2-dihydroxyethyl or a radical of the formula COO$^\ominus$M$^\oplus$ or SO$_3\ominus$M$\oplus$, Y$^2$ and Y$^3$ are identical or different and are each independently of the other halogen or hydroxymethyl, and M$\oplus$ is the equivalent of a cation, L$^4$ is hydrogen, C$_1$–C$_8$-alkyl, which may be interrupted by 1 or 2 oxygen atoms in ether function and may be substituted, substituted or unsubstituted phenyl, halogen, C$_1$–C$_8$-alkoxy, substituted or unsubstituted phenoxy, C$_1$–C$_8$-alkylthio, C$_1$–C$_8$-alkylsulfonyl, substituted or unsubstituted phenylthio, substituted or unsubstituted phenylsulfonyl, C$_1$–C$_8$-alkoxycarbonyl, C$_3$–C$_6$-alkenyloxycarbonyl or phenoxycarbonyl, X is nitrogen or the radical C-L$^5$, where L$^5$ is cyano, C$_1$–C$_8$-alkoxycarbonyl, C$_3$–C$_6$-alkenyloxycarbonyl, phenoxycarbonyl, C$_1$–C$_8$-alkanoyl, benzoyl, carbamoyl, mono- or di(C$_1$–C$_4$-alkyl)carbamoyl, phenylcarbamoyl, C$_1$–C$_8$alkylsulfonyl or substituted or unsubstituted phenylsulfonyl, and K is the radical of a coupling component, to novel crystal forms of thienylazobenzene dyes and to the use of said dyes for dyeing or printing textile materials.

DE-A-3 529 831, GB-A-2 071 684, DE-A-2 818 101, EP-A-362 637, DE-A-3 906 066, EP-A-201 896 and EP-A-390 666 disclose azo dyes which are similar to those of the formula I. They have a carbonyl group in ring position 5 of the thiophene or thiazole ring. It has been found that the solubility of these dyes leaves something to be desired. Nor is their application property profile satisfactory in every respect.

It is an object of the present invention to provide novel azo dyes which are free of the abovementioned defects.

We have found that this object is achieved by the azo dyes of the formula I defined at the beginning.

In the azo dyes of the formula I, K can be for example the radical of a coupling component of the aniline, aminothiazole, pyrazole, diaminopyridine, hydroxypyridone or quinoline series.

Emphasis is given to azo dyes of the formula I where K is a radical of the formula

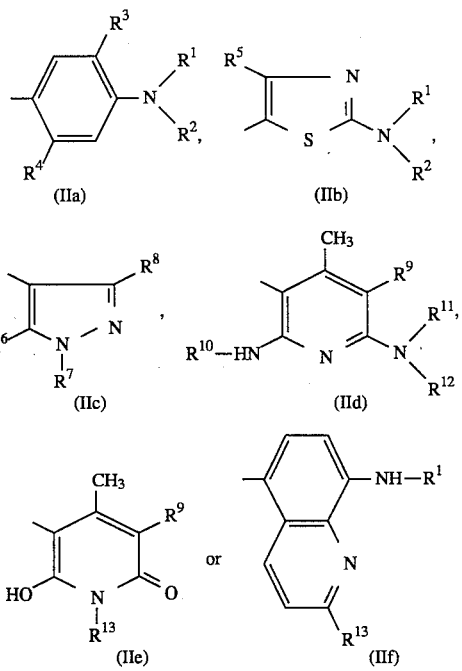

where

R$^1$ and R$^2$ are identical or different and each is independently of the other hydrogen, substituted or unsubstituted C$_1$–C$_8$-alkyl, which may be interrupted by 1 or 2 oxygen atoms in ether function, C$_5$–C$_7$ -cycloalkyl or C$_3$–C$_6$-alkenyl, which may be substituted by halogen, in particular by chlorine or bromine, R$^3$ is hydrogen, C$_1$–C$_8$-alkyl or C$_1$–C$_8$-alkoxy, R$^4$ is hydrogen, C$_1$–C$_8$alkyl, C$_1$–C$_8$-alkoxy, C$_1$–C$_8$-alkylsulfonylamino, substituted or unsubstituted C$_1$–C$_8$-alkanoylamino or benzoylamino, R$^5$ is hydrogen, C$_1$–C$_8$-alkyl, substituted or unsubstituted phenyl or thienyl, R$^6$ is amino or hydroxyl, R$^7$ is C$_1$–C$_8$-alkyl, which may be interrupted by 1 or 2 oxygen atoms in ether function, benzyl, C$_5$–C$_7$-cycloalkyl, C$_3$–C$_6$-alkenyl or substituted or unsubstituted phenyl R$^8$ is hydrogen or C$_1$–C$_8$-alkyl, R$^9$ is cyano, carbamoyl or acetyl, R$^{10}$, R$^{11}$ and R$^{12}$ are identical or different and each is independently of the others substituted or unsubstituted C$_1$–C$_8$-alkyl which may be interrupted by 1 or 2 oxygen atoms in ether function, C$_5$–C$_7$-cycloalkyl, substituted or unsubstituted phenyl, C$_3$–C$_6$-alkenyl, substituted or unsubstituted benzoyl, C$_1$–C$_8$-alkanoyl, C$_1$–C$_8$-alkylsufonyl or substituted or unsubstituted phenylsulfonyl, or R$^{11}$ and R$^{12}$ are together with the nitrogen atom joining them together a 5- or 6-membered saturated heterocyclic radical, which may contain further hetero atoms, and R$^{13}$ is hydrogen or C$_1$–C$_8$-alkyl.

Any alkyl or alkenyl appearing in the abovementioned formulae may be straight-chain or branched.

Any substituted phenyl appearing in the above-mentioned formulae may have as substituents for example $C_1$–$C_4$-alkyl, chlorine, bromine, nitro, $C_1$–$C_4$-alkoxy, $C_1$–$C_4$-alkoxycarbonyl, carboxyl or hydroxysulfonyl. The number of substituents in substituted phenyl is in general from 1 to 3.

Any substituted alkyl appearing in the abovementioned formulae may have as substituents for example hydroxyl, halogen, cyclohexyloxy, phenoxy, $C_1$–$C_4$-alkanoyloxy, $C_1$–$C_4$-alkoxycarbonyl, $C_1$–$C_4$-alkoxy-$C_1$–$C_4$-alkoxycarbonyl, $C_1$–$C_4$-alkanoyloxy, hydroxysulfonyl, cyano, cyclohexyl or substituted or unsubstituted phenyl. The number of substituents in substituted alkyl is in general from 1 to 3.

$L^1$, $L^2$, $L^3$, $L^4$, $R^1$, $R^2$, $R^3$, $R^4$, $R^5$, $R^7$, $R^8$, $R^{10}$, $R^{11}$, $R^{12}$ and $R^{13}$ are each for example methyl, ethyl, propyl, isopropyl, butyl, isobutyl, sec-butyl, pentyl, isopentyl, neopentyl, tert-pentyl, hexyl, 2-methylpentyl, heptyl, octyl, isooctyl or 2-ethylhexyl.

$L^4$ may also be for example methylthio, ethylthio, propylthio, isopropylthio, butylthio, isobutylthio, pentylthio, hexylthio, heptylthio, octylthio, 2-ethylhexylthio, phenylthio, 2-methylphenylthio, 2-methoxyphenylthio, 2-chlorophenylthio, fluorine, chlorine, bromine, phenoxy, 2-methylphenoxy, 2-methoxyphenoxy, 2-chlorophenoxy, phenyl, 2-, 3- or 4-methylphenyl, 2,4-dimethylphenyl, 2-, 3- or 4-methoxyphenyl, 2-, 3- or 4-chlorophenyl or 2-, 3- or 4-methoxyphenyl.

$L^4$, $R^3$ and $R^4$ may also be for example methoxy, ethoxy, propoxy, isoproproxy, butoxy, isobutoxy, secbutoxy, pentyloxy, isopentyloxy, neopentyloxy, tertpentyloxy, hexyloxy, 2-methylpentyloxy, heptyloxy, octyloxy, isooctyloxy or 2-ethylhexyloxy.

$L^{15}$ may also be for example, like $L^4$, $R^{10}$, $R^{11}$ and $R^{12}$ methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, heptylsulfonyl, octylsulfonyl, 2-ethylhexylsulfonyl, phenylsulfonyl, 2-methylphenylsulfonyl, 2-methoxyphenylsulfonyl or 2-chlorophenylsulfonyl.

$L^4$ and $L^5$ may also be for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, hexyloxycarbonyl, heptyloxycarbonyl, octyloxycarbonyl, 2-ethylhexyloxycarbonyl, prop-2-en-1-yloxycarbonyl, 2-methylprop-2-en-1-yloxycarbonyl, but-2-en-1-yloxycarbonyl or but-3-en-1-yloxycarbonyl.

$R^1$, $R^2$, $R^{11}$, $R^{12}$ and $R^{13}$ may also be for example cyclopentyl, cyclohexyl or cycloheptyl.

$L^5$ may also be for example formyl, acetyl, propionyl, butyryl, pentanoyl, hexanoyl, heptanoyl, octanoyl, 2-ethylhexanoyl, mono- or dimethylcarbamoyl, mono- or diethylcarbamoyl, mono- or dipropylcarbamoyl, mono- or diisopropylcarbamoyl, mono- or dibutylcarbamoyl or N-methyl-N-ethylcarbamoyl.

$L^1$, $L^2$, $L^4$, $R^1$, $R^2$, $R^{10}$, $R^{11}$ and $R^{12}$ may also be for example 2-methoxyethyl, 2-ethoxyethyl, 2-propoxyethyl, 2-isopropoxyethyl, 2-butoxyethyl, 2-isobutoxyethyl, 2- or 3-methoxypropyl, 1-methoxyprop-2-yl, 2- or 3-ethoxypropyl or 2- or 3-propoxypropyl, 3,6-dioxaheptyl, 3,6-dioxaoctyl, 4,7-dioxaoctyl, 4,7-dioxanonyl, 4,8-dioxadecyl, 2-hydroxyethyl, 2- or 3-hydroxypropyl, 1-hydroxyprop-2-yl, 2- or 4-hydroxybutyl, 3-hydroxybut-2-yl, trifluoromethyl, 2-chloroethyl, 2- or 3-chloropropyl, 2-cyclohexyloxyethyl, 2- or 3-cyclohexyloxypropyl, 2-4-cyclohexyloxybutyl, 2-phenoxyethyl, 2-phenoxypropyl, 3-phenoxypropyl, 4-phenoxybutyl, 2-formyloxyethyl, 2-acetyloxyethyl, 2-propionyloxyethyl, 2- or 3-acetyloxypropyl, 2- or 4-acetyloxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, 2-cyclohexylethyl, 2- or 3-cyclohexylpropyl, 2-hydroxysulfonylethyl, 2- or 3-hydroxysulfonylpropyl, benzyl, 1- or 2-phenylethyl, carboxybenzyl, 1- or 2-carboxyphenylethyl, hydroxysulfonylbenzyl, 1- or 2-hydroxysulfonylphenylethyl, methoxycarbonylbenzyl, 1- or 2-methoxycarbonylphenylethyl, 2-acetyloxyethyl, 2-propionyloxyethyl, 2- or 3-acetyloxypropyl, prop-2-en-1-yl, 2-methylprop-2-en-1-yl, but-2-en-1-yl, but-3-en-1-yl or 3-chloroprop-2-en-1-yl.

$R^{11}$ combined with $R^{12}$ and the nitrogen atom joining them together to form a five- or six-membered saturated heterocyclic radical, which may contain further hereto atoms, can be for example pyrrolidinyl, piperidinyl, morpholinyl, thiormorpholinyl, thiomorpholinyl S, S-dioxide, piperazinyl or N-($C_1$–$C_4$-alkyl) piperazinyl, such as N-methyl- or N-ethyl-piperazinyl.

$L^2$ combined with $L^3$ to form the radical of the formula

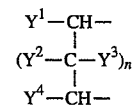

can be for examples:

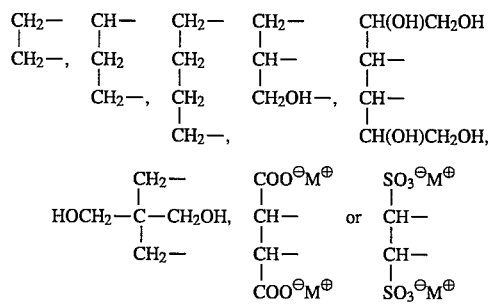

$M^\oplus$ is the equivalent of a cation. Suitable cations are metal ions. Metal ions are in particular the ions of lithium, of sodium or of potassium.

Emphasis is given here to sodium and potassium ions, of which sodium ions are particularly important.

Preference is given to azo dyes of the formula I where $L^1$ is hydrogen or $C_1$–$C_8$-alkyl, $L^4$ is substituted or unsubstituted phenyl, halogen or $C_1$–$C_8$-alkoxy, and X is nitrogen or the radical C-$L^5$, where $L^5$ is cyano or $C_1$–$C_8$-alkoxycarbonyl.

Preference is also given to azo dyes of the formula I where $L^2$ and $L^3$ are each independently of the other unsubstituted or hydroxyl-substituted $C_1$–$C_8$-alkyl, or $L^2$ and $L^3$ are together a radical of the formula

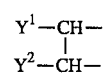

where $Y^1$ and $Y^2$ are each as defined above.

Preference is further given to azo dyes of the formula I where K is the radical of a diazo component of the aniline series, in particular a radical of the formula IIa.

Particular preference is given to azo dyes of the formula I where $L^1$ is hydrogen or $C_1$–$C_4$-alkyl, $L^4$ is chlorine, bromine or $C_1$–$C_4$-alkoxy, and X is nitrogen or the radical C-$L^5$ where $L^5$ is cyano or $C_1$–$C_4$-alkoxycarbonyl.

Particular preference is further given to azo dyes of the formula I where $L^2$ and $L^3$ are each independently of the other $C_1$–$C_4$-alkyl or together a radical of the formula

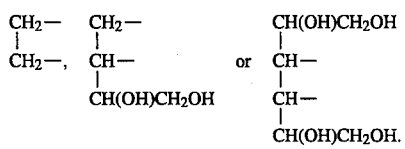

Particular preference is further given to azo dyes of the formula I where K is a radical of the formula IIa where $R^1$ and $R^2$ are each independently of the other $C_1$–$C_4$-alkyl, which may be interrupted by 1 oxygen atom in ether function and may hydroxyl-, cyano- or $C_1$–$C_4$-alkanoyloxy-substituted, $C_3$–$C_4$-alkenyl, which may be substituted by chlorine, or else in the case of $R^1$ hydrogen, $R^3$ is hydrogen, and $R^4$ is $C_1$–$C_4$-alkanolylamino, whose alkyl chain may be interrupted by an oxygen atom in ether function.

Very particular emphasis is given to azo dyes of the formula Ia

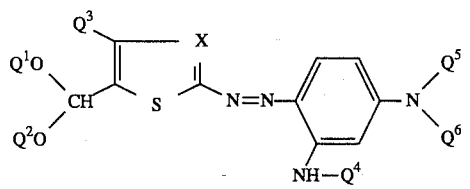

where $Q^1$ and $Q^2$ are each independently of the other $C_1$–$C_4$-alkyl or a radical of the formula

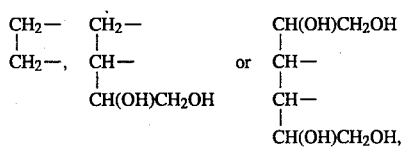

$Q_3$ is chlorine,

X is nitrogen or the radical C—CN, $Q^4$ is acetyl, propionyl or methoxyacetyl, and $Q^5$ and $Q^6$ are each independently of the other $C_1$–$C_4$-alkyl, which may be interrupted by an oxygen atom in ether function and may be hydroxyl-, cyano- or acetyloxy-substituted, prop-2-en-1-yl or 3-chloroprop-2-en-1-yl, or else in the case of $Q^5$ hydrogen.

The dyes of the formula I of the invention can be obtained in a conventional manner. One possibility is for example to acetalize a carbonylazo dye of the formula IV

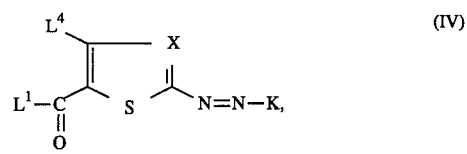

where $L^1$, $L^4$, X and K are each as defined above, with a hydroxy compound of the formula Va, Vb, Vc or Vd

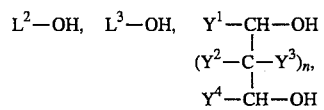

where $L^2$, $L^3$, $Y^1$, $Y^2$, $Y^3$, $Y^4$, $M^\oplus$ and n are each as defined above, under acid catalysis in the presence or absence of an inert solvent, for example toluene.

Those azo dyes of the formula I of the invention that are free of hydroxysulfonyl groups are advantageously useful as disperse dyes for dyeing or printing textile fibers or fabrics, in particular polyesters, but also fibers or fabrics made of cellulose esters or polyamides or blend fabrics from polyester and cellulose fibers.

To obtain an advantageous color buildup it can be of advantage in some cases to use mixtures between the dyes of the formula I.

The novel azo dyes are notable for high color strength, good fastness properties and brilliant hues.

The azo dyes of the invention are also advantageously useful for thermal transfer from a transfer sheet to plastic-coated paper by means of an energy source (see for example EP-A-416 434).

If acidic dyeing liquors are employed, the acetalized azo dyes of the formula I can also be used with advantage as intermediates for the dyeing of textile fibers or fabrics with the carbonylazo dyes of the formula IV.

This is because the presence of acid in the aqueous dyeing liquor hydrolyzes the acetal group of dye I to form the carbonyl group of the dye of the formula IV.

This technique is particularly advantageous compared with the carbonylazo dyes of the formula IV, since the novel dyes of the formula I are more soluble and thus make it possible to distinctly reduce in the finished dye product the proportion of the frequently slow-to-biodegrade dispersant.

It is also possible to use the novel dyes of the formula I as intermediates for purifying the carbonylazo dyes of the formula IV by acetalizing a carbonylazo dye IV and subsequently hydrolyzing the acetal group.

This method is particularly favorable with the dyes of the formula Ia. The dyes obtained have a brilliance when dyed up that is otherwise obtained only with anthraquinone dyes.

The present invention further provides novel crystal forms of each of the dyes of the formulae IIIa, IIIb and IIIc

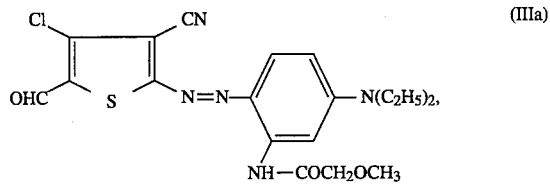

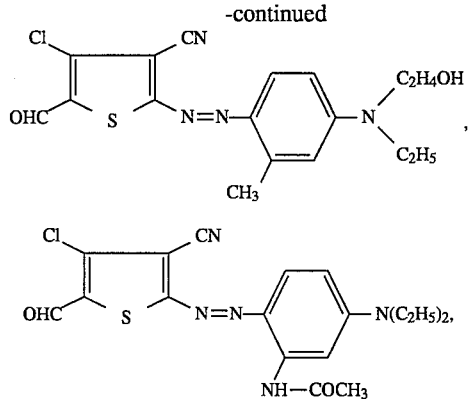

which crystal forms have the following X-ray diffraction diagrams (Cu-$K_g$ radiation):

IIIa)
  lines of high intensity at diffraction angles Θ [°] of 8.497 and 9.175;
  lines of medium intensity at diffraction angles Θ [°] of 7.018, 11.836 and 9.721;
  lines of low intensity at diffraction angles Θ [°] of 5.164, 5.920, 25.934, 24.425, 23.442, 26.335, 13.119, 7.906, 15.674, 13.963, 15.153, 27.471, 14.630, 17.028, 8.833, 20.982, 28.275, 21.247, 19.490, 29.898, 30.726 and 34.570;

IIIb)
  lines of high intensity at diffraction angles Θ [°] of 4.971 and 12.551;
  lines of medium intensity at diffraction angles Θ [°] of 2.850 and 11.093;
  lines of low intensity at diffraction angles Θ [°] of 11.548, 9.100, 27.564, 29.233, 17.967, 7.424, 22.255, 30.296, 28.175, 13.645, 14.406, 17.368, 26.458, 16.018, 16.809, 19.206, 20.006, 32.464, 34.775, 33.479 and 33.833;

IIIc)
  lines of high intensity at diffraction angles Θ [°] of 7.441;
  lines of medium intensity at diffraction angles Θ [°] of 11.090;
  lines of low intensity at diffraction angles Θ [°] of 8.662, 10.063, 26.181, 17.373, 19.540, 22.901, 14.950, 12.888, 14.097, 15.961, 28.237, 27.752, 29.035, 32.108, 34.326, 33.239 and 33.543.

The prior art crystal forms of the dyes III, IIIb and IIIc have the following X-ray diffraction diagrams (Cu-$K_g$ radiation):

IIIa)
  lines of high intensity at diffraction angles Θ [°] of 7.472;
  lines of medium intensity at diffraction angles Θ [°] of 25.805 and 9.085;
  lines of low intensity at diffraction angles Θ [°] of 11.884, 12.523, 10.798, 5.911, 17.383, 15.967, 23.471, 28.185, 21.610, 28.487, 19.189, 29.894, 20.509 and 32.133;

IIIb)
  lines of high intensity at diffraction angles Θ [°] of 12.051;
  lines of medium intensity at diffraction angles Θ [°] of 9.100, 24.408, 25.772, 7.406, 13.393, 28.145, 8.194, 6.922 and 6.435;
  lines of low intensity at diffraction angles Θ [°] of 20.626, 14.420, 15.198, 21.433, 16.128, 17.635, 18.236, 30.787, 31.882, 33.865 and 34.834;

IIIC)
  lines of high intensity at diffraction angles Θ [°] of 26.470, 9.671, 11.277 and 25.759;
  lines of medium intensity at diffraction angles Θ [°] of 7.341, 8.449, 7.750, 10.755, 14.441, 24.870 and 27.019;
  lines of low intensity at diffraction angles Θ [°] of 12.715, 23.160, 21.288, 16.613, 21.531, 17.954, 22.268, 21.872, 19.583, 30.530, 32.342 and 32.958.

The X-ray diffraction diagrams were each recorded using a powder diffractometer of type D 5000 from Siemens.

The novel crystal forms of the dyes IIIa, IIIb and IIIc produce dyeings of very high brilliance on textile fibers or fabrics.

Embodiments of the invention will now be more particularly described by way of example.

EXAMPLE 1

240 g of the compound of the formula I

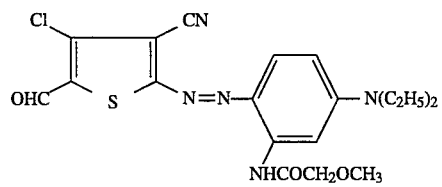

were refluxed in 2 l of methanol for 8 hours. After cooling the precipitate was filtered off with suction and dried under reduced pressure. The dye thus obtained had the formula

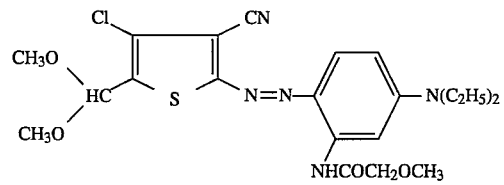

and was recrystallized from 1 l of toluene.

Yield: 160 g; melting point: 138° C.; $\lambda_{max}$ (in acetone): 562 nm ($\epsilon$=55000).

EXAMPLE 2

20 g of the compound of the formula

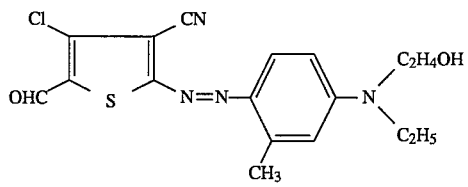

were refluxed in 500 ml of methanol for 4 hours. After cooling the residue was filtered off with suction at room temperature and the filtrate was admixed with 100 ml of water. The precipitated dye of the formula

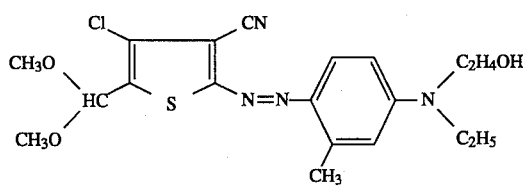

was filtered off with suction and dried.

Yield: 18.2 g; melting point: 140° C.; $\lambda_{max}$ (in acetone): 551 nm ($\epsilon$=46000).

EXAMPLE 3

7.5 g of the compound of the formula

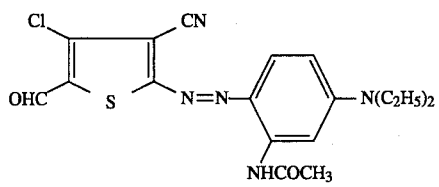

were refluxed in 250 ml of toluene, 5.4 g of ethylene glycol and 2 drops of phosphoric acid for 5 hours. The reaction mixture was then filtered hot and the filtrate was cooled down. The precipitated dye of the formula

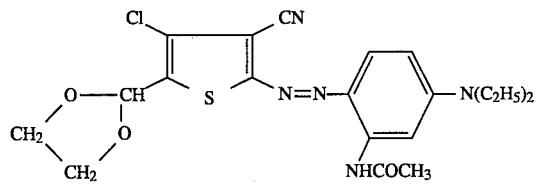

was filtered off with suction and dried.

Yield: 3.4 g; melting point: 181° C.; $\lambda_{max}$ (in acetone): 555 nm ($\epsilon$=56000).

The same method gives the dyes listed in Tables 1 to 6, where the abbreviations have the following meanings:

Me=methyl
Et=ethyl
Pr=propyl
Ac=acetyl

TABLE 1

| Ex. No. | $Z^1/Z^2$ | $Z^3$ | $Z^4$ | X | $Z^5$ | $Z^6$ | $Z^7$ | $Z^8$ |
|---|---|---|---|---|---|---|---|---|
| 4 | Me/Me | Cl | H | C—CN | NHAc | H | Et | Et |
| 5 | $CH_2$—CH—$CH_2OH$ | Cl | H | C—CN | NHAc | H | Et | Et |
| 6 | $CH_2$—CH—$CH_2OH$ | Cl | H | C—CN | $NHCOCH_2OCH_3$ | H | Et | Et |
| 7 | $HOCH_2$—CH—CH—$CH_2OH$ | Cl | H | C—CN | $NHCOCH_2OCH_3$ | H | Et | Et |
| 8 | Me/Me | Cl | H | N | NHAc | OEt | $C_2H_4CN$ | $CH_2CH=CHCl$ |
| 9 | $CH_2$—CH—$CH_2OH$ | Cl | H | C—CN | $NHCOEt$ | H | Bu | Bu |
| 10 | Me/Me | $SO_2C_6H_5$ | H | C—CN | NHAc | OMe | $C_2H_4OAc$ | $C_2H_4OAc$ |
| 11 | $(CH_2)_3$ | Cl | H | C—$CO_2Et$ | OMe | H | $C_2H_4OMe$ | $C_2H_4OMe$ |
| 12 | $(CH_2)_4$ | Cl | H | C—CN | Me | OMe | Et | $C_2H_4CN$ |
| 13 | iso-Bu/iso-Bu | Cl | H | C—CN | NHAc | | | |
| 14 | $CH_2OH$<br>$CH_2$—C—$CH_2$<br>$CH_2OH$ | Cl | H | C—CN | NHAc | OMe | H | $CH_2$—CH=CHCl |
| 15 | ![naphthalene disulfonate structure: $NaO_3S$—naphthalene—$SO_3Na$] | Cl | H | C—CN | $NHCOCH_2OCH_3$ | H | Bu | Bu |
| 16 | CH—CH   COONa<br>NaOOC | Cl | H | C—$CO_2Me$ | $NHCOCH_2OCH_3$ | H | Et | Et |
| 17 | $CH_2$—CH—$CH_2OH$ | Cl | H | N | NHAc | OMe | $C_2H_4C_6H_5$ | $C_2H_4OAc$ |
| 18 | Bu/Bu | Cl | H | N | NHAc | OEt | $C_2H_4CN$ | $CH_2CH=CH_2$ |
| 19 | Pr/Pr | Cl | H | N | NHAc | OMe | $CH_2CH=CHCl$ | $CH_2CH=CHCl$ |
| 20 | Et/Et | Cl | H | C—CN | NHCOEt | H | $C_2H_4OH$ | $C_6H_5$ |
| 21 | $(CH_2)_2$ | OEt | H | C—CN | Me | OEt | Et | $C_2H_4CN$ |
| 22 | Me/Me | $CO_2Me$ | H | C—CN | NHAc | OEt | Et | $C_2H_4CO_2Me$ |
| 23 | Et/Et | $C_6H_5$ | H | C—CN | NHAc | OEt | $C_2H_4OAc$ | $C_2H_4CN$ |
| 24 | $CH_2$—CH—$CH_2OH$ | $4-CH_3$—$C_6H_4$ | H | C—CN | NHAc | OEt | $C_2H_4CN$ | $CH_2$—CH=$CH_2$ |
| 25 | Me/Me | Me | H | C—CN | OEt | H | Et | $C_2H_4OAc$ |
| 26 | Et/Et | Cl | $CF_3$ | c—CN | NHAc | H | Et | Et |
| 27 | Me/Me | | H | | | | | |
| 28 | Pr/Pr | $C_6H_5$ | H | N | NHAc | OMe | $C_2H_4CN$ | $CH_2$—CH=$CH_2$ |

TABLE 1-continued

Structure:
$$Z^1O\text{—}C(OZ^2)\text{=}C(Z^3)\text{—}C(Z^4)\text{=}X\text{—}N\text{=}N\text{—}\text{Ar}$$
where Ar is a phenyl ring with $Z^5$, $Z^6$ substituents and $N(Z^7)(Z^8)$ group.

| Ex. No. | $Z^1/Z^2$ | $Z^3$ | $Z^4$ | X | $Z^5$ | $Z^6$ | $Z^7$ | $Z^8$ |
|---|---|---|---|---|---|---|---|---|
| 29 | CH—CH<br>\|    \|<br>NaO$_3$S  SO$_3$Na | SC$_6$H$_5$ | H | N | NHAc | OEt | CH$_2$CH=CH$_2$ | CH$_2$—CH=CH$_2$ |
| 30 | (CH$_2$)$_2$ | Me | Me | N | NHAc | OMe | C$_2$H$_4$CN | C$_2$H$_4$OAc |
| 31 |  | Br | H | C—CN | Me | H | C$_2$H$_4$OH | Et |
| 32 | NaO$_3$S-naphthalene-SO$_3$Na | Br | H | N | NHAc | OMe | CH$_2$CH=CHCl | CH$_2$CH=CHCl |
| 33 | CH—CH<br>\|    \|<br>NaO$_3$S  SO$_3$Na | OEt | H | C—CN | NHAc | OMe | C$_2$H$_4$OH | C$_2$H$_4$CN |
| 34 |  | C$_6$H$_5$ | H | N | H | H | C$_2$H$_4$OH | C$_2$H$_4$CO$_2$Me |
| 35 | CH—CH<br>\|    \|<br>NaOOC  COONa | SO$_2$C$_6$H$_5$ | H | N | OEt | OEt | C$_2$H$_4$OAc | C$_2$H$_4$OAc |
| 36 | Pr/Pr | Me | Me | N | H | H | Et | Et |
| 37 | Et/Et | 4-CH$_3$—C$_6$H$_4$ | H | C—CN | NHCOCH$_2$OCH$_3$ | H | Bu | Bu |
| 38 | Me/Me | H | H | C—CN | NHAc | H | C$_2$H$_4$OC$_2$H$_4$OAc | Et |
| 39 | Et/Et | SC$_6$H$_5$ | H | C—CN | NHAc | OMe | C$_2$H$_4$OC$_2$H$_4$OAc | Bu |
| 40 | Me/Me | CO$_2$Et | H | c—CN | NHCOEt | OMe | Pr | Pr |

TABLE 2

| Ex. No. | Z¹/Z² | Z³ | Z⁴ | X | Z⁵ | Z⁶ | Z⁷ |
|---|---|---|---|---|---|---|---|
| 41 | $CH_2$—CH—$CH_2OH$ | Cl | H | C—CN | Thien-2-yl | Et | Et |
| 42 | Me/Me | Cl | H | C—CN | $C_6H_5$ | Et | Et |
| 43 | Pr/Pr | OEt | H | C—CN | Thien-3-yl | Bu | Bu |
| 44 | Et/Et | $C_6H_5$ | H | C—CN | iso-Pr | Bu | Bu |
| 45 | $(CH_2)_2$ | Cl | H | N | Et | Et | Et |
| 46 | Me/Me | Cl | H | N | $C_6H_5$ | Et | Et |

TABLE 3

| Ex. No. | Z¹/Z² | Z³ | Z⁴ | X | Z⁵ | Z⁶ | Z⁷ | Z⁸ |
|---|---|---|---|---|---|---|---|---|
| 47 | $(CH_2)_2$ | Cl | H | C—CN | Et | Et | H | $C_2H_4C_6H_5$ |
| 48 | $CH_2$—CH—$CH_2OH$ | Cl | H | N | $C_2H_4OMe$ | $C_2H_4OMe$ | H | $C_3H_6OMe$ |
| 49 | $CH_2$—CH—$CH_2OH$ | $C_6H_5$ | H | C—CN | Et | Et | H | $C_3H_6OC_2H_4OC_6H_5$ |
| 50 | Me/Me | $SC_6H_5$ | H | N | $C_2H_4OMe$ | $C_2H_4OMe$ | H | Et |
| 51 | Pr/Pr | Cl | H | C—$CO_2Et$ | $C_2H_4OMe$ | $C_2H_4OMe$ | H | $CH_2CH=CH_2$ |
| 52 | $C_2H_4SO_3Na/C_2H_4SO_3Na$ | Cl | H | C—CN | Et | Et | H | $C_3H_6OEt$ |
| 53 | NaO₃S-(dimethylnaphthalene)-SO₃Na | Cl | H | C—CN | Et | $C_3H_6OMe$ | H | $C_3H_6OMe$ |
| 54 | CH—CH / HOCH₂(HO)CH  CH(OH)CH₂OH | Cl | H | C—CN | Et | Et | H | Et |

TABLE 4

| Ex. No. | Z¹/Z² | Z³ | Z⁴ | X | Z⁵ | Z⁶ | Z⁷ |
|---|---|---|---|---|---|---|---|
| 55 | Me/Me | Cl | H | C—CN | H | $NH_2$ | $C_6H_5$ |
| 56 | $CH_2$—CH—$CH_2OH$ | Cl | H | N | H | OH | $C_6H_5$ |
| 57 | Et/Et | $C_6H_5$ | H | C—CN | Me | $NH_2$ | $C_6H_5$ |
| 58 | Pr/Pr | Cl | $CF_3$ | C—CN | H | $NH_2$ | $C_6H_5$—$CH_2$ |
| 59 | Me/Me | $SC_6H_5$ | H | N | H | $NH_2$ | $C_6H_5$ |
| 60 | Pr/Pr | $CO_2Et$ | H | C—CN | H | $NH_2$ | $C_6H_5$—$CH_2$ |
| 61 | $(CH_2)_2$ | OEt | H | C—CN | Me | $NH_2$ | $C_6H_5$ |

TABLE 5

[Structure with $Z^3$, $Z^4$, $Z^2O$, $OZ^S$, X, $CH_3$, CN, $Z^5$, $Z^6$, OH, N groups]

| Ex. No. | $Z^1/Z^2$ | $Z^3$ | $Z^4$ | X | $Z^5$ |
|---|---|---|---|---|---|
| 62 | Me/Me | OEt | H | C—CN | Et |
| 63 | Pr/Pr | Cl | H | C—CN | $C_6H_5$ |
| 64 | $(CH_2)_2$ | Br | H | C—CN | $CH_2C_6H_5$ |
| 65 | CH—CH<br>\|　　\|<br>NaOOC　COONa | Cl | H | N | $C_2H_4OC_2H_4OC_6H_5$ |
| 66 | $CH_2$—CH—$CH_2OH$ | $C_6H_5$ | H | C—CN | Pr |
| 67 | CH—CH<br>\|　　\|<br>$HOCH_2(HO)CH$　$CH(OH)CH_2OH$ | $CH_3$ | H | C—CN | Me |
| 68 | Et/Et | $CH_3$ | $CH_3$ | N | Me |

TABLE 6

[Structure with $Z^3$, $Z^4$, $Z^2O$, $OZ^S$, X, $Z^6$, N, $NHZ^5$ groups]

| Ex. No. | $Z^1/Z^2$ | $Z^3$ | $Z^4$ | X | $Z^5$ | $Z^6$ |
|---|---|---|---|---|---|---|
| 69 | $CH_2CH_2$ | Cl | H | C—CN | $CH_2CHCH_2OCH(Me)_2$<br>\|<br>OH | Me |
| 70 | Me/Me | Cl | H | C—CN | $CH_2CHCH_2OCH(Me)_2$<br>\|<br>OH | Me |
| 71 | Me/Me | Cl | H | N | $CH_2CHCH_2OCH(Me)_2$<br>\|<br>OH | Me |
| 72 | Me/Me | Cl | H | N | $CH_2CH_2CO_2Me$ | Me |
| 73 | $CH_2CH_2$ | Cl | H | C—CN | $CH_2CH_2CN$ | Me |
| 74 | $CH_2CH_2$ | Cl | H | C—CN | $CH_2CH_2OEt$ | Me |

EXAMPLE 75

10 g of the dye of Example 1 were stirred for 1 hour with 20 ml of tetrahydrofuran and 100 ml of 10% strength by weight sulfuric acid with heating to 60° C. Thereafter the mixture was cooled with ice and filtered with suction, and the filter residue was dried under reduced pressure.

This yielded 9.5 g of the dye of the formula

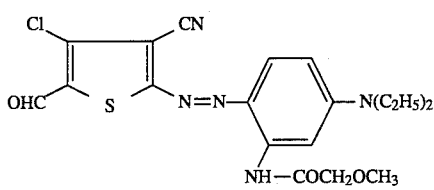

in a novel crystal form which has the following X-ray diffraction diagram;

lines of high intensity at diffraction angles Θ [°] of 8.497 and 9.175;

lines of medium intensity at diffraction angles Θ [°] of 7.018, 11.836 and 9.721;

lines of low intensity at diffraction angles Θ [°] of 25.164, 5.920, 25.934, 24.425, 23.442, 26.335, 13.119, 17.906, 15.674, 13.963, 15.153, 27.471, 14.630, 17.028, 18.833, 20.982, 28.275, 21.247, 19.490, 29.898, 30.726 and 34.570.

EXAMPLE 76

10 g of the dye of Example 2 were stirred for 1 hour with 20 ml of tetrahydrofuran and 100 ml of 10% strength by weight sulfuric acid with heating to 60° C. Thereafter the mixture was cooled down with ice and filtered with suction and the filter residue was dried under reduced pressure.

This yielded 9.2 g of the dye of the formula

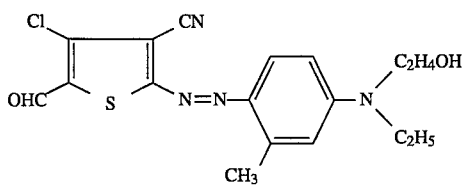

in a novel crystal form which has the following X-ray diffraction diagram:

lines of high intensity at diffraction angles Θ [°] of 24.971 and 12.551;

lines of medium intensity at diffraction angles Θ [°] of 22.850 and 11.093;

lines of low intensity at diffraction angles Θ [°] of 11.548, 9.100, 27.564, 29.233, 17.967, 7.424, 22.255, 30.296, 28.175, 13.645, 14.406, 17.368, 26.458, 16.018, 16.809, 19.206, 20.006, 32.464, 34.775, 33.479 and 33.833.

EXAMPLE 77

10 g of the dye of Example 3 were starred for 1 hour with 20 ml of tetrahydrofuran and 100 ml of 10% strength by weight sulfuric acid with heating to 60° C. Thereafter the mixture was cooled down with ice and filtered with suction and the filter residue was dried under reduced pressure.

This yielded 9.7 g of the dye of the formula

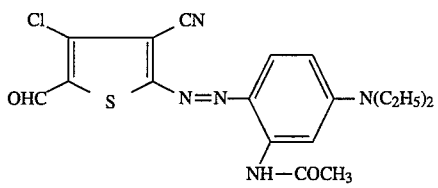

in a novel crystal form which has the following X-ray diffraction diagrams lines of high intensity at diffraction angles Θ [°] of 7.441;

lines of medium intensity at diffraction angles Θ [°] of 11.090;

lines of low intensity at diffraction angles Θ [°] of 8.662, 10.063, 26.181, 17.373, 19.540, 22.901, 14.950, 12.888, 14.097, 15.961, 28.237, 27.752, 29.035, 32.108, 34.326, 33.239 and 33.543.

We claim:

1. An azo dye of the formula I

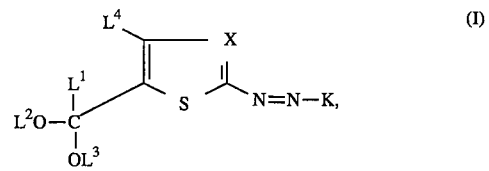

where $L^1$ is hydrogen, $C_1$–$C_8$-alkyl or phenyl, $L^2$ and $L^3$ are identical or different and each is independently of the other $C_1$–$C_8$-alkyl, which may be substituted and may be interrupted by 1 or 2 oxygen atoms in ether function, or together are a radical of the formula

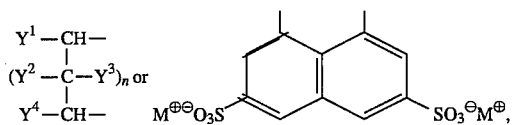

where n is 0, 1 or 2, $Y^1$ and $Y^4$ are identical or different and each is independently of the other hydrogen, hydroxymethyl, 1,2-dihydroxyethyl or a radical of the formula $COO^{\ominus}M^{\oplus}$ or $SO_3^{\oplus}M^{\ominus}$, $Y^2$ and $Y^3$ are identical or different and are each independently of the other halogen or hydroxymethyl, and $M^{\oplus}$ is the equivalent of a cation, $L^4$ is hydrogen, $C_1$–$C_8$-alkyl, which may be interrupted by 1 or 2 oxygen atoms in ether function and may be substituted, substituted or unsubstituted phenyl, halogen, $C_1$–$C_8$-alkoxy, substituted or unsubstituted phenoxy, $C_1$–$C_8$-alkylthio, $C_1$–$C_8$-alkylsulfonyl, substituted or unsubstituted phenylthio, substituted or unsubstituted phenylsulfonyl, $C_1$–$C_8$-alkoxycarbonyl, $C_3$–$C_6$-alkenyloxycarbonyl or phenoxycarbonyl, X is nitrogen or the radical C—$L^5$, where $L^5$ is cyano, $C_1$–$C_8$-alkoxycarbonyl, $C_3$–$C_6$-alkenyloxycarbonyl, phenoxycarbonyl, $C_1$–$C_8$-alkanoyl, benzoyl, carbamoyl, mono- or di($C_1$–$C_4$-alkyl)carbamoyl, phenylcarbamoyl, $C_1$–$C_8$-alkylsulfonyl or substituted or unsubstituted phenylsulfonyl, and K is the radical of a coupling component.

2. An azo dye as claimed in claim 1, wherein K is the radical of a coupling component of the aniline, aminothiazole, pyrazole, diaminopyridine, hydroxypyridone or quinoline series.

3. An azo dye as claimed in claim 1, wherein

K is a radical of the formula

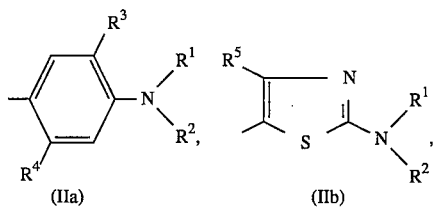

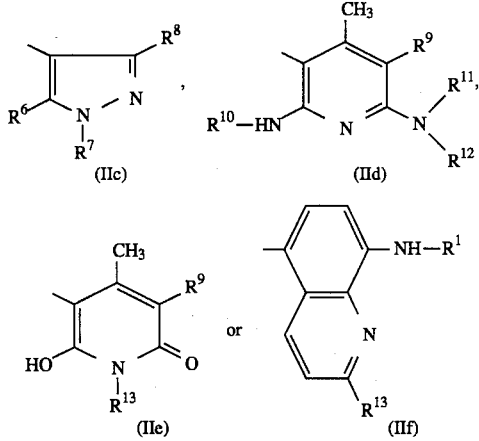

$R^1$ and $R^2$ are identical or different and each is independently of the other hydrogen, substituted or unsubstituted $C_1$–$C_8$-alkyl, which may be interrupted by 1 or 2 oxygen atoms in ether function, $C_5$–$C_7$-cycloalkyl or $C_3$–$C_6$-alkenyl, which may be substituted by halogen, $R^3$ is hydrogen, $C_1$–$C_8$-alkyl or $C_1$–$C_8$-alkoxy, $R^4$ is hydrogen, $C_1$–$C_8$-alkyl, $C_1$–$C_8$-alkoxy, $C_1$–$C_8$-alkylsulfonylamino, substituted or unsubstituted $C_1$–$C_8$-alkanoylamino or benzoylamino, $R^5$ is hydrogen, $C_1$–$C_8$-alkyl, substituted or unsubstituted phenyl or thienyl, $R^6$ is amino or hydroxyl, $R^7$ is $C_1$–$C_8$-alkyl, which may be interrupted by 1 or 2 oxygen atoms in ether function, benzyl, $C_5$–$C_7$-cycloalkyl, $C_3$–$C_6$-alkenyl or substituted or unsubstituted phenyl, $R^8$ is hydrogen or $C_1$–$C_8$-alkyl, $R^9$ is cyano, carbamoyl or acetyl, $R^{10}$, $R^{11}$ and $R^{12}$ are identical or different and each is independently of the others substituted or unsubstituted $C_1$–$C_8$-alkyl which may be interrupted by 1 or 2 oxygen atoms in ether function, $C_5$–$C_7$-cycloalkyl, substituted or unsubstituted phenyl, $C_3$–$C_6$-alkenyl, substituted or unsubstituted benzoyl, $C_1$–$C_8$-alkanoyl, $C_1$–$C_8$-alkylsulfonyl or substituted or unsubstituted phenylsulfonyl, or $R^{11}$ and $R^{12}$ are together with the nitrogen atom Joining them together a 5- or 6-membered saturated heterocyclic radical, which may contain further hetero atoms, and $R^{13}$ is hydrogen or $C_1$–$C_8$-alkyl.

4. An azo dye as claimed in claim 1, wherein $L^1$ is hydrogen or $C_1$–$C_8$-alkyl, $L^4$ is substituted or unsubstituted phenyl, halogen or $C_1$–$C_8$-alkoxy, and X is nitrogen or the radical C—$L^5$, where $L^5$ is cyano or $C_1$–$C_8$-alkoxycarbonyl.

5. An azo dye as claimed in claim 1, wherein $L^2$ and $L^3$ are each independently of the other unsubstituted or hydroxyl-substituted $C_1$–$C_8$-alkyl, or $L^2$ and $L^3$ are together a radical of the formula

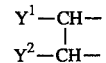

where $Y^1$ and $Y^2$ are each as defined in claim 1.

6. A process for the dyeing or printing of textile fibers or fabrics comprising applying thereto a dye of claim 1.

* * * * *